(12) United States Patent
Barry et al.

(10) Patent No.: US 7,467,354 B2
(45) Date of Patent: Dec. 16, 2008

(54) METHOD TO SEARCH DATA

(75) Inventors: Gerald E. Barry, Chatfield, MN (US); Darel V. Benysh, Rochester, MN (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/420,821

(22) Filed: May 30, 2006

(65) Prior Publication Data

US 2007/0283259 A1 Dec. 6, 2007

(51) Int. Cl.
*G06F 15/00* (2006.01)
*G06F 13/00* (2006.01)
(52) U.S. Cl. .................................. 715/764; 715/762
(58) Field of Classification Search .................. 715/700, 715/763–765, 840, 850–854, 762
See application file for complete search history.

(56) References Cited

U.S. PATENT DOCUMENTS 5,721,900 A  2/1998  Banning et al.

7,200,816 B2* 4/2007 Falk et al. ................... 715/762
2003/0233430 A1* 12/2003 Hill et al. ..................... 709/221

OTHER PUBLICATIONS

Banning, KR et al., "Dynamic, Interactive Show SQL Window" IBM Technical Disclosure Bulletin; Sep. 1992; p. 101-102.

* cited by examiner

*Primary Examiner*—Cao Nguyen
(74) *Attorney, Agent, or Firm*—Cantor Colburn LLP; Randall Bluestone

(57) ABSTRACT

A method for searching data includes displaying an interactive user interface (UI) having a first display panel configured to display at least one facet corresponding to a category of the data, and a second display panel configured to display at least one of the data and links to the data; expanding the facet, thereby displaying elements and/or subelements of the data organized within the facet; choosing an algorithm for selecting and relating the elements and the subelements of the data, indicated via a global indicator displayed on the first display panel; selecting the elements and/or subelements of the data to cause the data and/or links to the data to be displayed in the second display panel; and viewing the data and/or links to the data displayed in the second display panel in response to the selection of at least one of the elements and the subelements of the data.

5 Claims, 4 Drawing Sheets

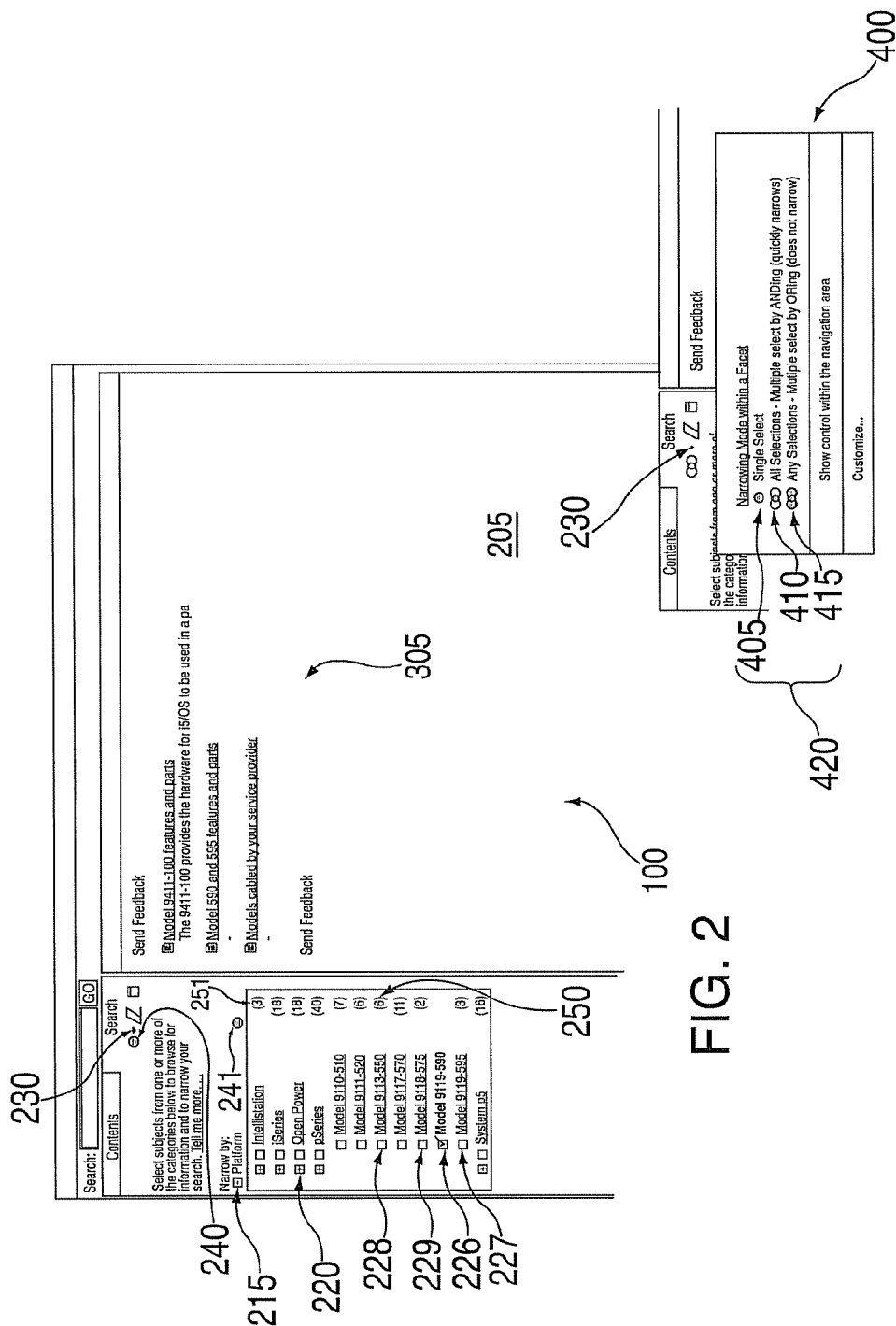

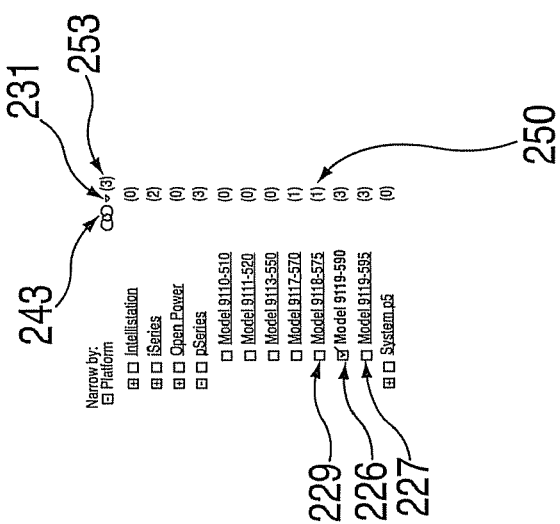
FIG. 6
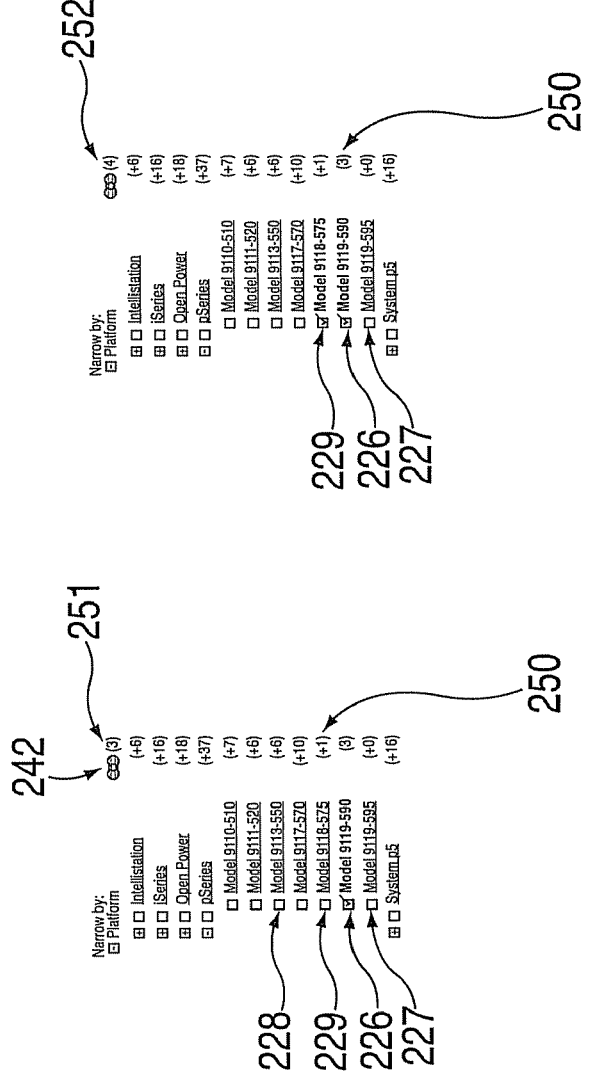
FIG. 5
FIG. 4

METHOD TO SEARCH DATA

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to data management, and particularly to selection of data elements.

2. Description of Background

Before our invention, one method of searching data has included categorical searches in which a user may select from elements or subelements of data contained within particular categories, also known as facets. In general, when users multi-select across facets they typically want to narrow the results. This may be accomplished via a Boolean AND operator, limited to the selection of only one element or subelement within each facet, thereby reducing the returned results to the common intersection of the selection of data elements across facets.

However, within a facet, users may not want to limit the search to only one of the nearby related elements or subelements within a facet. Additional selections, in conjunction with a Boolean OR operation may accommodate this. Attempts to allow the selection of more than one element or subelement within a single facet via a Boolean OR operation in usability testing have discovered user confusion with the increase in result count with multiple selections within a facet, as contrasted with the decrease when selections were made in different facets.

Different narrowing modes, specifically relating elements via a Boolean AND across facets and a Boolean OR within a facet, might be what users sometimes or often want to do, but it doesn't effectively work within the current UI structure. Conceptual confusion may result from within-facet narrowing that might work differently than between-facet narrowing, such as the non-narrowing increase in the numeric hit indicators within a facet resulting from multiple selection, for example. It is also generally a hard concept to have different narrowing methods for the different levels in the facet structure. Simplification has been provided by the restriction of within-facet selections to a single selection, but it isn't as powerful as some users may want.

SUMMARY OF THE INVENTION

In an exemplary embodiment, a method for searching data includes displaying an interactive user interface (UI), the UI comprising a first display panel configured to display at least one facet, each facet corresponding to a category of the data, and a second display panel configured to display at least one of the data and links to the data; expanding the at least one facet, thereby displaying at least one of elements and subelements of the data, the elements and the subelements of the data organized within the associated facet; choosing an algorithm for selecting and relating the elements and the subelements of the data, the chosen algorithm indicated via a global indicator displayed on the first display panel; selecting at least one of the elements and the subelements of the data to cause at least one of the data and the links to the data to be displayed in the second display panel; and viewing at least one of the data and the links to the data displayed in the second display panel in response to the selection of at least one of the elements and the subelements of the data; wherein the choosing an algorithm comprises choosing an algorithm for selecting and relating more than one of the elements and the subelements of the data within one facet; and wherein the choosing an algorithm comprises choosing at least one of a Single Select algorithm, for selecting one element or subelement within each facet; an All Selections algorithm, for selecting more than one element and subelement within each facet, and relating them via a Boolean AND; and an Any Selections algorithm, for selecting more than one element and subelement within each facet, and relating them via a Boolean OR.

TECHNICAL EFFECTS

As a result of the summarized invention, technically we have achieved a solution which allows a user performing a faceted (categorical) data search the flexibility to choose an algorithm for selecting more than one data element within a facet and to define the results based upon different relations between the elements within each facet. Further, to prevent any confusion regarding the relation applied within the facet, a graphical indicator provides a clear visual reminder of the algorithm chosen.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of an enlarged portion of the UI of FIG. 1.

FIG. 3 illustrates one example of an algorithm selection dialog box of the UI of FIG. 1.

FIG. 4 illustrates another example of an enlarged portion of the UI of FIG. 1.

FIG. 5 illustrates yet another example of an enlarged portion of the UI of FIG. 1.

FIG. 6 illustrates a further example of an enlarged portion of the UI of FIG. 1.

The detailed description explains the preferred embodiments of the invention, together with advantages and features, by way of example with reference to the drawings.

DETAILED DESCRIPTION OF THE INVENTION

Users may benefit from an interactive user interface (UI) having highly surfaced controls to change between multiple within-facet narrowing modes. Direct and contextual inline indicators to display the within-facet narrowing mode chosen for each facet may help to reduce confusion regarding the response behavior of the different within-facet narrowing modes.

Embodiments of this invention provide surfaced inline controls and indicators for users to easily toggle between single selection and multiple selection options and understand how the faceting works at both high and lower levels. Doing this provides the advantage of increasing the user's power to filter large data sets. Also, within a facet, it would resolve user uncertainty among related choices. For example, if a user was uncertain among 2 or 3 choices, the user could select all of them and then see the integrated results at once.

Figure 1:
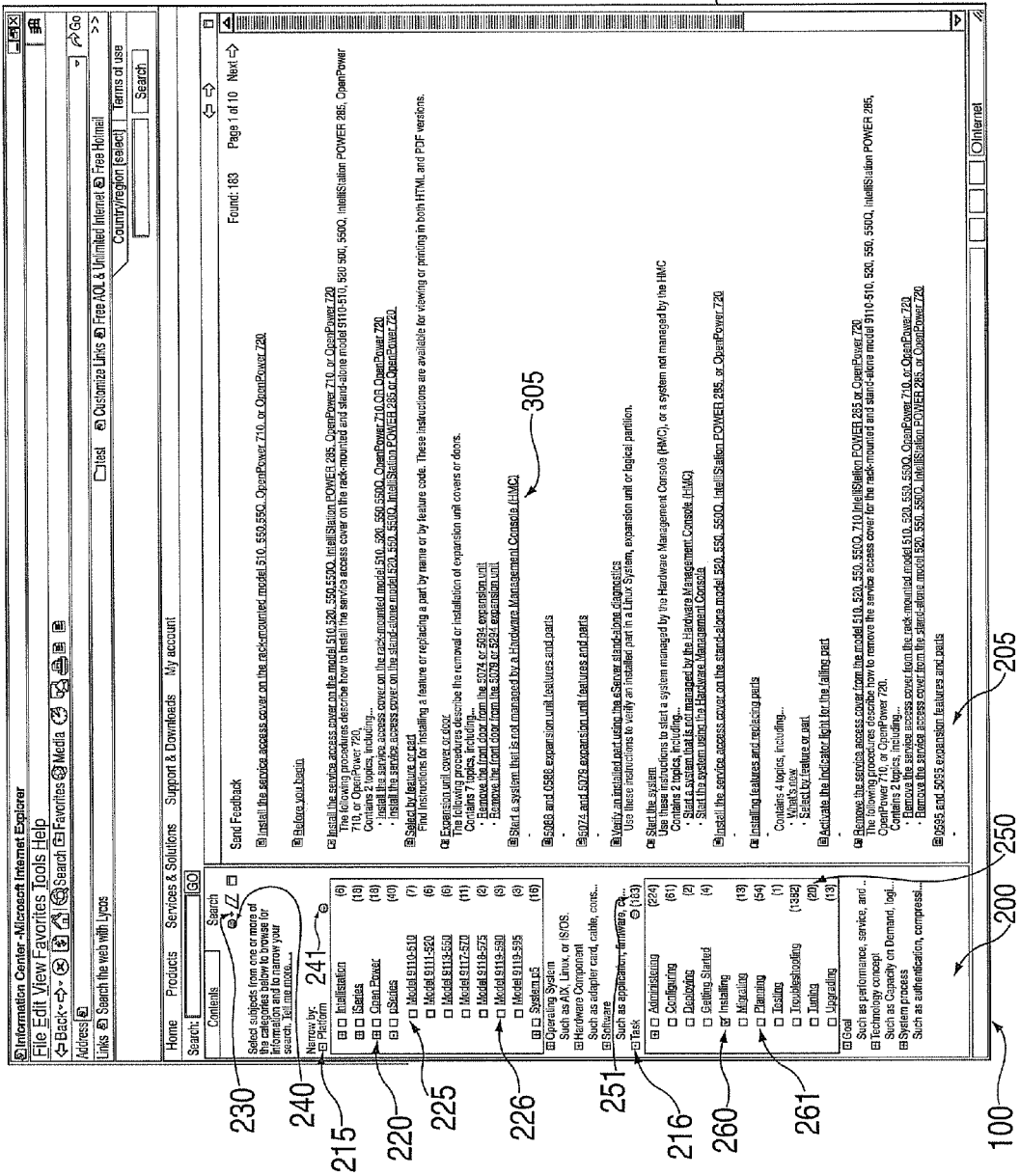
FIG. 1 illustrates one example of an interactive user interface (UI) to manage the searching of data in accordance with an embodiment of the invention.

Turning now to the drawings in greater detail, it will be seen that FIG. 1 depicts an embodiment of an exemplary interactive user interface (UI) display 100 to manage searching of data. The data may be present within a data storage device 130 in data communication with a processing unit 140. The processing unit 140 may be in data communication with input devices, such as a mouse 145 and a keyboard 150, for example, or may be remotely located such as in a server and be in signal communication a screen 120 of a display device 125. While an embodiment has been depicted with data stored upon a data storage device 130 local to the processing unit 140, it will be appreciated that the scope of the invention is not so limited, and that the invention will also apply to alternate program storage devices that are readable by the processing unit, such as a storage device connected to the processing unit via a network, for example.

In an embodiment, the UI 100 comprises a first display panel 200 and a second display panel 205. The data stored upon the data storage device 130 may be arranged by categories, (also herein referred to as facets) 215. As used herein, reference numeral 215 may be used to refer to facets generally, as well as the "Platform" facet as depicted. At least one facet 215 shall be displayed on the first display panel 200, wherein each facet 215 corresponds to a category of the data. The data within the facets 215 is further organized by at least one of elements 220 and subelements 225 of the data. As used herein, reference numerals 220 and 225 shall be used to refer to elements and subelements generally.

While an exemplary embodiment has been depicted having one level of subelements 225 of data beneath the elements 220 of data within a facet 215, it will be appreciated that the scope of the invention is not so limited, and that the invention will also apply to UI's that may employ additional, multiple levels of data within a facet 215, such as a subelement of data beneath a subelement of data, beneath an element of data, for example.

In an embodiment, the first display panel 200 of the UI 100 will include a means, such as a drop-down arrow 230, to choose an algorithm for selecting and relating the elements 220 and the subelements 225 of the data. The means to choose 230 shall comprise an algorithm for selecting and relating more than one of the elements 220 and the subelements 225 of the data within one facet 215 within the first display panel 200. Also displayed on the first display panel 200 will be a global indicator 240 to symbolically indicate the chosen algorithm. Further, a local indicator 241 is associated with each facet 215 and displayed on the first display panel 200. The local indicator 241 is configured to indicate the chosen algorithm associated with each facet 215. The second display panel 205 will display at least one of the data and links 305 to the data. The data and links to the data 305 displayed on the second display panel 205 will be in response to selection of at least one of the elements 220 and the subelements 225 of the data. The indicators 240, 241 are located proximate to the facets 215, thereby providing a direct and contextual inline indication of the chosen algorithm.

A results indicator 250 is associated with each element 220 and subelement 225 of data, and displayed on the first display panel 200. The results indicator 250 is configured to indicate the quantity of data associated with each element 220 and subelement 225 of data in response to the chosen algorithm. As used herein, reference numeral 250 may refer to any result indicator associated with any of the displayed elements 220 or subelements 225 of data. Additionally, a facet results indicator 251, is associated with each facet 215, and displayed on the first display panel 200. The facet results indicator 251 is configured to indicate the quantity of data associated with the elements 220 and subelements 225 that have been selected, as will be discussed further below.

In the exemplary embodiment of the UI 100 depicted in FIG. 1, no more than one element 220 or subelement 225 can be selected within any one facet 215. It may be seen that "Installing" element 260, located within the "Task" facet 216 is selected, as shown by the checkmark adjacent the element 260. In response to the selection of the "Installing" element 260, the results indicator 250 associated with the "Installing" element 260 is not displayed, and the facet results indicator 251 indicates that 183 pieces of data or links to data 305 are associated with the "Installing" element 260 of the "Task" facet 216. It may be appreciated that alternatively selecting the "Planning" element 261 instead of the "Installing" element 260 would provide 54 pieces of data or links to data 305 associated with the "Planning" element 261.

Further, selection of elements in other facets 215 will cause the search to be narrowed via operation of a Boolean AND, thereby reducing the results to pieces of data or links to data 305 that are common to the respective facets 215 and elements 220 or subelements 225. The results indicators 250 are configured to preemptively display the result of selection of the element 220 or subelement 225. For example, as shown by the facet results indicator 251, there are 183 pieces of data or links to data 305 which relate to the element "Installing" 260 of the facet "Task" 216. To narrow the "Installing" element 260 of the "Task" facet 216 further, one may select an element 220 or sub element 225 from the "Platform" facet 215. For example, selection of the "Model 9119-590" subelement 226 will narrow the 183 pieces of data or links to data 305 that generally correspond to the "Task" 216 of "Installing" 260, to the 3 pieces of data or links to data 305 that also correspond to the to the "Platform" 215 of the "Model 9119-590" 226.

Referring now to FIG. 2, an enlarged view of the UI 100 is depicted. By way of illustration, it may be considered that a user is interested to know about the data pertaining to the subelements 226, 227 that correspond to "Model 9119", but is unaware whether he is most interested in the subelement 226 that corresponds to "Model 9119-590" or the subelement 227 that corresponds to "Model 9119-595".

It may be seen in the exemplary embodiment of FIG. 2 that the sub-element 226 "Model-9119-590" is selected. It may also be seen that the results indicator 250 associated with the subelement 226 is not displayed in response to the selection of subelement 226. The facet results indicator 251 indicates that there are 3 pieces of data 300 or links to data 305 associated with the selected element 226. In response to the selection of subelement 226, 3 pieces of data or links to data 305 are displayed on the second display panel 205. Alternatively, the results indicator 250 associated with the "Model 9119-595" subelement 227 indicates that in response to the selection of subelement 227 3 pieces of data or links to data 305 would be displayed on the second display panel 205.

Referring now to FIG. 3, in an embodiment, the user may select the drop-down arrow 230, which will cause a selection mode dialog box 400 to open. In conjunction with the drop down arrow 230, the selection mode dialog box 400 allows the user to choose an algorithm 420 to select and relate the elements 220 and subelements 225 within the facet 215. The selection mode dialog box 400 also displays the results indicator 240, 241 associated with each algorithm 420. The selection mode dialog box 400 will contain at least one of the following algorithms 420: a Single Select algorithm 405, for selecting one element 220 or subelement 225 within each facet 215; an All Selections algorithm 410, for selecting multiple elements 220 and subelements 225 within each facet 215 and relating them via a Boolean AND operator; and an Any Selections algorithm 415, for selecting multiple elements 220 and subelements 225 within each facet 215 and relating them via a Boolean OR operator, which will be described further below. As used herein, reference numeral 420 will be used to refer to the selection and relation algorithm generally, while reference numerals 405, 410, 415 will refer to the specific algorithms described above. As will be discussed further below, the appearance of the indicators 240, 241, 250, 251 will change in response to the algorithm 420 selected.

Referring now to FIG. 4, an enlarged portion of an embodiment of the first display panel 200 is depicted in response to the choice of the Any Selections 415 algorithm. The appearance of the local indicator 242 has changed to indicate that selection and relation of the elements 220 and the subelements 225 of data will be in accordance with the Any Selections 415 algorithm. The Any Selections 415 algorithm allows selection of multiple elements 220 or subelements 225 of data within one facet 215. Further, the Any Selections 415 algorithm relates the elements 220 and the subelements 225 via the Boolean OR operator. In response to the Boolean OR operator, each additional selection of an element 220 or subelement 225 will cause only the pieces of data 300 or links to data 305 that are different within each element 220 or subelement 225 to be displayed upon the second display panel 205.

In the embodiment as depicted in FIG. 4, following the selection of the "Model 9119-590" subelement 226, the facet results indicator 251 shows the 3 pieces of data or links to data 305 associated with the selected subelement 226, as discussed previously with reference to FIG. 2. However, in response to the choice of the Any Selections 415 algorithm, the results indicator 250 associated with the selected subelement 226 will continue to be displayed following the selection. Further, it may be appreciated that the "+" is used to make it clearer to users that the effects of additional selections responding to the Boolean OR operator are additive, not narrowing. For example, the "(+0)" for the subelement 227 preemptively indicates that selection of subelement 227 will provide no additional, different pieces of data or links to data 305, thereby allowing the user to preemptively not make that selection. Referring back to FIG. 2 in which subelements 226 and 227 are each shown to contain 3 pieces of data or links to data 305, the implication may be recognized that because subelement 227 is shown in FIG. 4 to have no different pieces of data, the data contained within subelement 226 and subelement 227 (as related to the selection of the "Installing" element 260, discussed above with respect to FIG. 1) are the same. Similarly, it may be recognized, with reference to FIG. 2 along with FIG. 4, that while subelement 229 contains 2 pieces of data, selection of subelement 229 along with subelement 226 would only yield 1 piece of additional, different data, therefore informing the user that 1 piece of common data is contained within subelement 229 and subelement 226.

While an embodiment of the invention has been described employing a "+" (plus sign), it will be appreciated that the scope of the invention is not so limited, and that the invention will apply to other symbols to indicate the relation of pieces of data in response to the selection of the element 220 or subelement 225 of data 300, such as an "" (underscore) or "x" (x character) for example.

Referring now to FIG. 5, an enlarged portion of an embodiment of the first display panel 200 is depicted, in response to the selection of more than one subelement 225, specifically, subelement 229 in addition to subelement 226, as discussed above. In response to the selection of subelement 229 in addition to subelement 226, the facet results indicator 252 indicates that there are 4 pieces of data 300 or links to data 305 associated with the selected elements 226, 229 that are displayed on the second display panel 205.

Referring now to FIG. 6, an enlarged portion of an embodiment of the first display panel 200 is depicted, in response to the choice of the All Selections 410 algorithm. It may be seen that the appearance of the local indicator 243 has changed to indicate that the selection and relation of the elements 220 and subelements 225 of data 300 will be in accordance with the All Selections 410 algorithm. The All Selections 410 algorithm allows selection of multiple elements 220 or subelements 225 of data within one facet 215. Further, the All Selections 410 algorithm relates the elements 220 and the subelements 225 via the Boolean AND operator. In response to the Boolean AND operator, each additional selection of an element 220 or subelement 225 will cause only the pieces of data 300 or links to data 305 that are the same within each element 220 or subelement 225 to be displayed upon the second display panel 205.

The facet results indicator 253 shows the 3 pieces of data 300 or links to data 305 associated with the selected element 226. In response to the choice of the All Selections 410 algorithm, the results indicator 250 associated with the selected subelement 226 displays the number of results associated with the selected subelement 226. Further, the results indicators 250 associated with the other elements 220 or subelements 225 of data display the number of identical pieces of data 300 or links to data 305 in common with the selected subelement 226. It may be appreciated that, as discussed above with reference to FIGS. 4 and 2, but presented now in the manner such that the results indicators 250 are the same, subelement 227 may be understood to contain all the same pieces of data as selected subelement 226. Similarly, subelement 229 contains 1 piece of common data with selected subelement 226. Further, selection of subelement 229, in addition to the selection of subelement 226, will reduce the facet results indicator 253 (and the number of pieces of data or links to data 305 displayed on the second display panel 205) from 3 to 1.

In an embodiment, as shown in reference to FIGS. 1 and 2, the drop-down arrow 230 is a global means to choose the selection method, thereby causing the algorithm 420 chosen by the drop-down arrow 230 to be applied to all facets 215. However, as shown in FIG. 6, a local-drop down arrow 231 corresponding to each facet 215 may be provided as a local means to choose the algorithm 420, wherein the algorithm 420 chosen by the local means to choose 231 is applied to the corresponding facet 215, thereby overriding the global means to choose 230. The means to choose 230, 231 the selection methods are highly surfaced, or available to the user without the need to open or navigate any additional control windows, and located inline with the facets 215, allowing the user to quickly determine and choose the appropriate algorithm 420.

Figure 7:
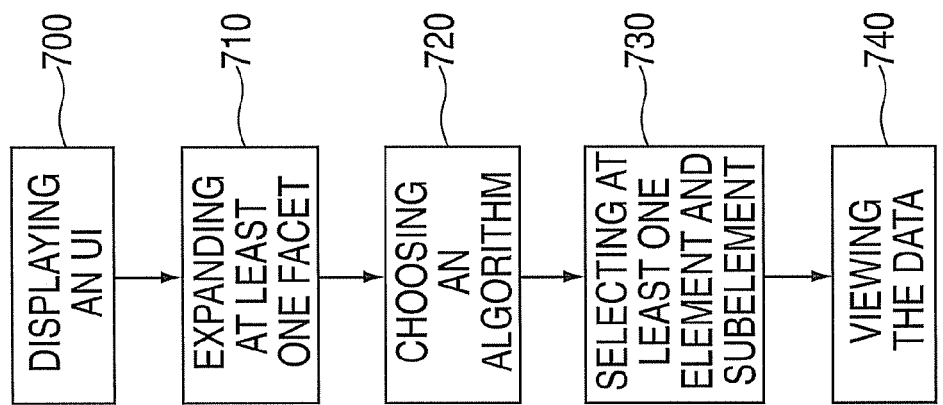
FIG. 7 illustrates one example of a flowchart for a method to practice an embodiment of the invention.

Accordingly, a method of use of the UI 100 will now be discussed with reference to FIGS. 1 and 7.

The method begins with providing and displaying 700 the interactive user interface (UI) 100. The method proceeds with determining which facets 215 to expand 710, thereby displaying at least one of the elements 220 and the subelements 225 of the data organized within the facet 215. Next, choosing 720 an algorithm 420 for selecting and relating the elements 220 and the subelements 225 of the data. At least one of the algorithms 420 is for selecting and relating more than one of the elements 220 and the subelements 225 of the data within one facet 215. Selecting 730 at least one of the elements 220 and the subelements 225 of the data will cause at least one of the data and links to the data 305 to be displayed in the second display panel 205. Finally, viewing 740 at least one of the data and links to the data 305 displayed in the second display panel 205 in response to the selection 730 of at least one of the elements 220 and the subelements 225 of the data.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for searching data, comprising:

displaying an interactive user interface (UI), the UI comprising a first display panel configured to display at least one facet, each facet corresponding to a category of the data, and a second display panel configured to display at least one of the data and links to the data;

expanding the at least one facet, thereby displaying at least one of elements and subelements of the data, the elements and the subelements of the data organized within the associated facet;

choosing an algorithm for selecting and relating the elements and the subelements of the data, the chosen algorithm indicated via a global indicator displayed on the first display panel;

selecting at least one of the elements and the subelements of the data to cause at least one of the data and the links to the data to be displayed in the second display panel; and viewing at least one of the data and the links to the data displayed in the second display panel in response to the selection of at least one of the elements and the subelements of the data;

wherein the choosing an algorithm comprises choosing an algorithm for selecting and relating more than one of the elements and the subelements of the data within one facet; and wherein the choosing an algorithm comprises choosing at least one of:

a Single Select algorithm, for selecting one element or subelement within each facet;

an All Selections algorithm, for selecting more than one element and subelement within each facet, and relating them via a Boolean AND; and an Any Selections algorithm, for selecting more than one element and subelement within each facet, and relating them via a Boolean OR.

2. The method of claim 1, wherein:

the choosing an algorithm comprises choosing a global algorithm to be applied to all facets.

3. The method of claim 2, further comprising:

choosing a local algorithm, the local algorithm corresponding to each facet;

wherein the chosen local algorithm is applied to the corresponding facet and overrides the chosen global algorithm.

4. The method of claim 1, wherein:

the choosing an algorithm results in a local indicator associated with each facet displayed on the first display panel to indicate the chosen algorithm associated with each facet.

5. The method of claim 1, wherein the displaying further comprises:

displaying a results indicator associated with each element and subelement of the data displayed on the first display panel to indicate a quantity of the data associated with each element and subelement of the data in response to the chosen algorithm.

* * * * *